Feb. 15, 1927.
C. C. AVERILL
1,617,741
PROCESS FOR BREAKING PETROLEUM EMULSIONS
Filed June 26, 1926
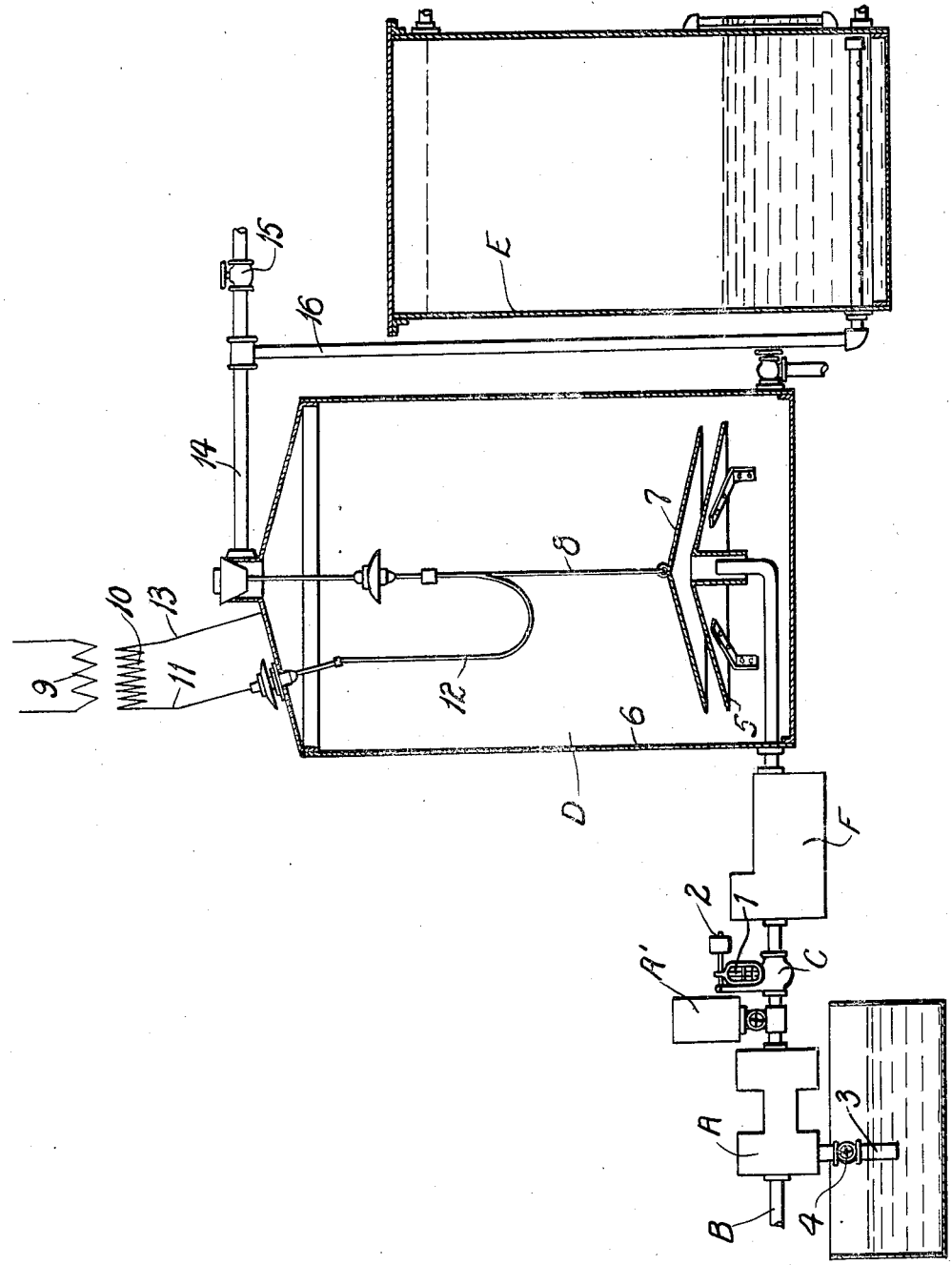
INVENTOR
CHARLES C. AVERILL
By Bakewell + Church
ATTORNEYS Patented Feb. 15, 1927.

1,617,741

UNITED STATES PATENT OFFICE.

CHARLES C. AVERILL, OF HOUSTON, TEXAS, ASSIGNOR TO WM. S. BARNICKEL & COMPANY, OF WEBSTER GROVES, MISSOURI, A CORPORATION OF MISSOURI.

PROCESS FOR BREAKING PETROLEUM EMULSIONS.

Application filed June 26, 1926. Serial No. 118,769.

This invention relates to the treatment of emulsions of mineral oil and water, such as petroleum emulsions, for the purpose of breaking the emulsion, and thus causing or permitting the oil to separate from the water.

Petroleum emulsions are of the water-in-oil type, and comprise fine droplets of natural occurring waters or brines dispersed in a more or less permanent state throughout the oil which constitutes the continuous phase of the emulsion. They are obtained from producing wells and from the bottoms of storage tanks and are commonly referred to as "cut oil", "roily oil", "emulsified oil" and "bottom settlings", etc.

The object of the invention is to provide a novel, practicable and inexpensive process for separating emulsions of the kind referred to into their component parts of oil and water or brine, so as to obtain merchantable oil that will be accepted by pipe line companies.

In my pending application for patent Ser. No. 106,417 for processes for breaking petroleum emulsions, filed May 3, 1926, I have disclosed a process that contemplates subjecting the emulsion to homogenization and subsequently subjecting the emulsion to electrical dehydrating action. In the process forming the subject matter of my present application, a chemical demulsifying agent, such as hydroxy stearic acid, beta napthol ester of ricinoleic acid or stearo lactone is added to the emulsion, the emulsion is then subjected to homogenization, with or without the addition of water as described in my said pending application, and thereafter the emulsion is subjected to electrical tension between electrodes maintained at high potential difference, and thereafter, if necessary, permitting the treated product to remain in a quiescent state whereupon the oil and water will separate by gravity. It is not necessary in all instances to add water to the emulsion during or prior to the homogenizing operation, or cause the treated liquid to remain in a quiescent state after being subjected to electrical dehydration, but with some emulsions this procedure is desirable.

Various types and kinds of apparatus can be used for practising the process, so long as said apparatus comprises a means for adding a chemical demulsifying agent to the emulsion and subjecting the emulsion to homogenization or vigorous agitation; an electrical dehydrator for subjecting the emulsion to electrical tension, and a settling tank or the like into which the treated product can be introduced, if necessary or desirable.

The figure of the drawings is a diagrammatic vertical sectional view of an apparatus that can be used for practising the process.

Referring to said drawings, A designates a pump that is used for drawing the emulsion from a source of supply through a line B, A' designates a device known commercially as a "Tret-O-Lizer" that is used for adding a chemical demulsifying agent of the kind previously mentioned to the emulsion after it has passed through said pump, C designates a device for homogenizing the emulsion or subjecting it to intensive agitation of such a character as to simultaneously decrease the diameter of the water droplets and their distance apart and make said droplets of substantially uniform size, D designates an electrical dehydrator to which the emulsion is supplied after the homogenizing operation, and E designates a settling tank into which the treated product can be passed from the electrical dehydrator D, if necessary. Any suitable means can be used to produce homogenization of the kind above referred to, such as a valve C arranged in the line through which the emulsion is supplied to the electrical dehydrator and constructed or adjusted so that the passage of the emulsion through said valve subjects the emulsion to vigorous agitation. One type of valve or homogenizing device C that is suitable for this purpose is provided with a tapered valve member arranged with its peripheral edge spaced slightly away from a tapered valve seat, a stem 1 attached to said valve member and a weighted lever 2 that acts on the stem and holds the valve member in adjusted position. In order that water may be added to the emulsion, a water supply pipe 3 is connected to the intake of the pump A; said water supply pipe being provided with a valve 4 that can either be closed or adjusted so as to add water to the emulsion, depending upon the character or nature of the emulsion.

The electrical dehydrator D may either be of the type commonly referred to as a Cottrell dehydrator that employs an electrical field of a potential difference of around 11,000 volts, or it may be of a type suitable for use in carrying out the process described in U. S. Patent No. 1,570,209, to J. H. C. De Brey, dated January 19, 1926, which contemplates the use of a much higher voltage. In the apparatus herein illustrated the electrical dehydrator D is of conventional construction and comprises a grounded electrode 5 supported inside of a metal tank 6, a live electrode 7 arranged above and in spaced relation to the grounded electrode, a rod 8 from which the live electrode 7 is suspended, a transformer provided with a primary 9 and a secondary 10, one terminal 11 of said secondary 10 being electrically connected by a flexible wire 12 to the rod 8 and the other terminal 13 of said secondary being directly connected to the tank 6. At the upper end of the tank 6 of the dehydrator is a discharge pipe 14 provided with an outlet valve 15 and a branch 16 that leads to the settling tank E. In instances where it is necessary or desirable to have the liquid remain in a quiescent state after passing through the dehydrator, the valve 15 is closed so as to cause the treated liquid escaping from the dehydrator to pass into the settling tank E.

After being subjected to the homogenizing operation produced by the device C, the emulsion passes into the electrical dehydrator D, wherein it is subjected to electrical tension between the electrodes 5 and 7. If desired, the treated liquid or product can be introduced into the settling tank E, after escaping from the dehydrator, so as to cause the oil and water of the emulsion to separate by gravity. In most instances it is unnecessary to heat the emulsion, but in order that the emulsion may be heated when necessary or desirable, prior to passing it through the electrical dehydrator, the apparatus is provided with a heater F arranged in the line through which the emulsion travels to the dehydrator after being subjected to homogenization.

In the apparatus herein illustrated the "Tret-O-Lizer" or other means A' that is used for adding the chemical demulsifying agent to the emulsion is arranged in advance of the homogenizing device C, but I wish it to be understood that it is immaterial whether the "Tret-O-Lizer" is arranged in this manner, or in such relation with the homogenizing device that the emulsion will be subjected to homogenization prior to the addition of the demulsifying agent to the emulsion.

Having thus described my invention, what I claim as new and desire to secure by Letters Patent is:

1. A process for breaking a natural occurring petroleum emulsion of the water-in-oil type, characterized by adding a chemical demulsifying agent to the emulsion and also subjecting the emulsion to homogenization of such a character as to make the water droplets of substantially uniform size and simultaneously decrease the diameter of said water droplets and their distance apart, and subsequently subjecting the emulsion to electrical dehydration.

2. A process for breaking a natural occurring petroleum emulsion of the water-in-oil type, characterized by adding water and a chemical demulsifying agent to the emulsion and subjecting the emulsion to homogenization of such a character as to make the water droplets of substantially uniform size and simultaneously decrease the diameter of said water droplets and their distance apart, and subsequently subjecting the emulsion to electrical dehydration.

3. A process for breaking a natural occurring petroleum emulsion of the water-in-oil type, characterized by adding a chemical demulsifying agent to the emulsion and also subjecting the emulsion to homogenization of such a character as to make the water droplets of substantially uniform size and simultaneously decrease the diameter of said water droplets and their distance apart, subsequently subjecting the emulsion to electrical dehydration, and thereafter permitting the emulsion to remain in a quiescent state.

CHARLES C. AVERILL.